Patented Apr. 21, 1925.

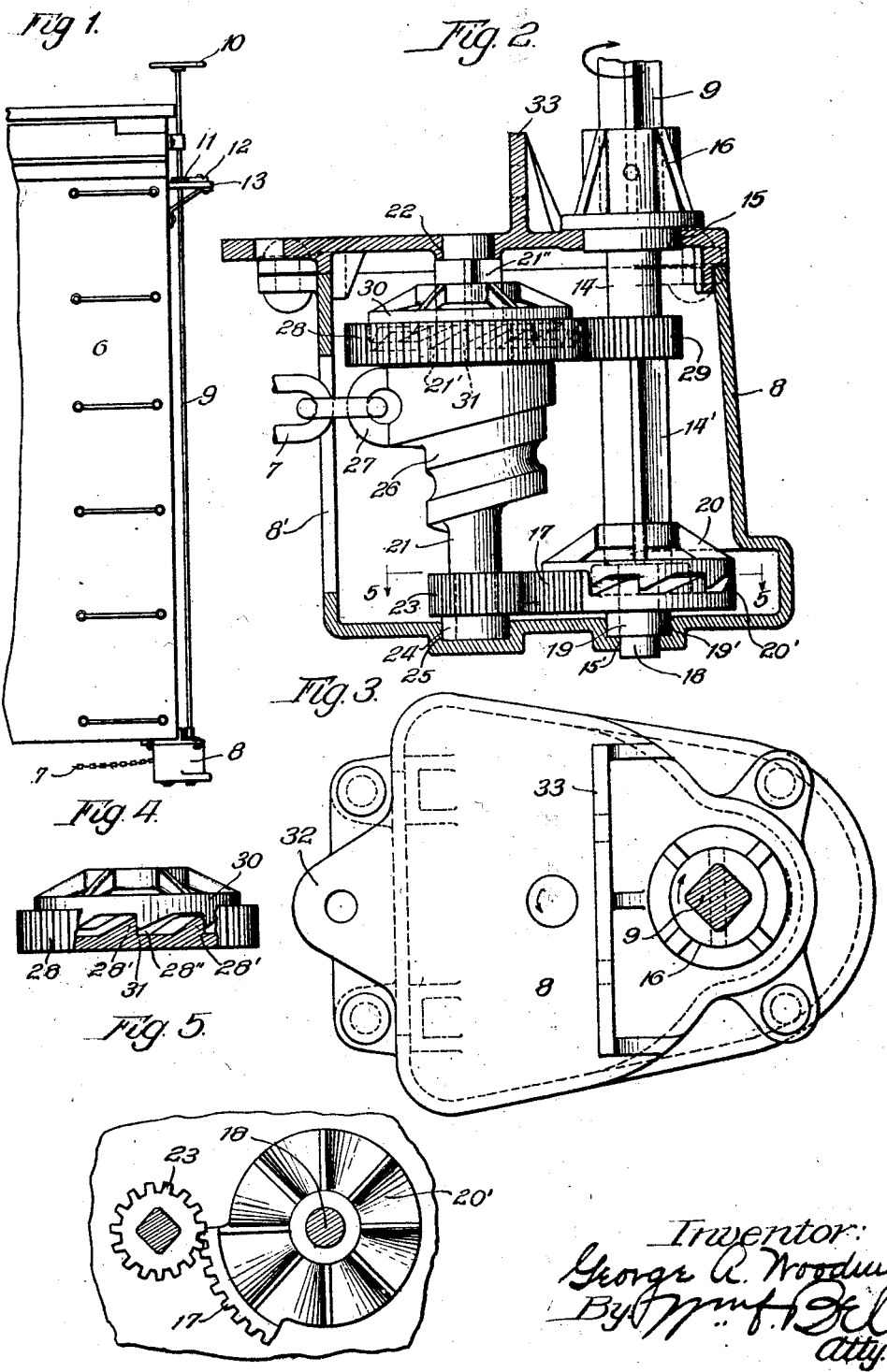

1,534,626

UNITED STATES PATENT OFFICE.

GEORGE A. WOODMAN, OF CHICAGO, ILLINOIS.

HAND BRAKE FOR RAILWAY CARS.

Application filed January 10, 1921. Serial No. 436,017.

*To all whom it may concern:*

Be it known that I, GEORGE A. WOODMAN, a citizen of the United States, residing at Chicago, in the county of Cook and State of Illinois, have invented certain new and useful Improvements in Hand Brakes for Railway Cars, of which the following is a specification.

This invention relates to hand brakes for railway cars and its object is to provide a brake adapted to be operated by the usual shaft and hand wheel to speedily take up the slack of the brake chain and bring the brake shoe quickly into contact with the car wheels and then apply the power effectively to secure the highest degree of brake efficiency.

A further object of the invention is to provide a compact device of simple, strong and substantial construction adapted to be applied to new cars and also to old cars which are equipped with hand wheel and shaft.

In the drawings I have illustrated a selected embodiment of the invention and referring thereto Fig. 1 shows the brake end of a box car with the invention applied thereon.

Fig. 2 is an enlarged sectional view through the casing showing the working parts in elevation.

Fig. 3 is a top plan view of the invention as shown in Fig. 2, the brake shaft being shown in section.

Fig. 4 is a detailed sectional view showing the power gear and ratchet device.

Fig. 5 is a plan view, with the shaft shown in section, showing the take up segment and ratchet device.

Referring to the drawings, 6 designates the car and 7 is the brake chain which is operated by the devices contained within the casing or frame 8 fastened by suitable means to the bottom of the car, and these devices are operated by the usual brake shaft 9 provided at its upper end with a hand wheel 10. The brake is held in set position by the usual ratchet wheel 11 and dog 12 mounted on the platform 13.

A shaft 14 is journaled in the bearings 15, 15' in the casing and it projects through the top of the casing and is provided with a square socket 16 to receive the lower end of the brake shaft 9. This shaft 14 constitutes an extension on the lower end of the brake shaft and should be considered a part of the brake shaft in this invention. For many years brake shafts round in cross section were used and when my invention is applied to cars having such brake shafts the lower ends are upset square to make locking engagement with the square socket 16. But for some time past the Safety First Commission has required the use of square shafts and the socket 16 is designed to receive the lower end of such shafts. It will be evident that the shaft 14 is thus held against axial movement.

A segment gear 17 is rotatively mounted on the lower rounded end portion 18 of the shaft 14. This gear is provided with a boss 19 on its lower side which has a bearing 19' in the bottom of the casing and the shaft has a bearing in this boss as well as in the bottom of the casing. A portion of the shaft 14' above the take up gear 17 is squared and a ratchet element 20 is mounted to turn with and to slide on this squared portion 14'. The take up segment gear is provided on its upper side with radial teeth forming a ratchet element 20' with which the ratchet element 20 operatively engages by gravity.

A drum or jack shaft 21 is journaled in a bearing 22 in the top of the casing and in a pinion 23 which meshes with the segment gear 17. This pinion has a boss 24 on its lower side which engages a bearing 25 in the bottom of the casing. That portion of the shaft 21 on which the pinion 23 is mounted is squared to make locking engagement with the pinion. A conic chain winding drum 26 is rigidly mounted on the shaft 21 and the brake chain 7 extends through an opening 8' in the casing and is connected to an eye 27 on said drum at its largest diameter. In the drawings I have shown the drum as an integral part of the shaft 21 and it will be preferably made in this way in actual practice, but it is apparent that the drum may be made separate from the shaft and the latter may be squared to receive the drum so that the latter will turn with the shaft.

Above the pulley 26 the drum shaft 21 is enlarged at 21' to form a bearing for the pinion 28 which is loosely mounted to turn freely on said shaft. The pinion 28 meshes with a gear 29 rigid on the shaft 14. In the form shown in the drawings this gear 29 is an integral part of the shaft 14. The shaft 21 has a squared portion 21'' above the bearing 21' and pinion 28, and a ratchet element 30 is mounted to turn with and to slide on this squared part of the shaft. The pinion 28 is provided on its upper side with radially disposed teeth 28' and forms a ratchet element 31 with which the ratchet element 30 engages by gravity. For economy of space I prefer to locate the ratchet element 31 in a recess 28'' formed in the gear 28.

The operative devices heretofore described are strong and substantial in construction and are compactly made and arranged within a comparatively small casing 8. This casing is located partly under the end sill of the car and is provided with laterally projecting lugs 32 to receive bolts for securing the casing to the end sill and is also provided with an upstanding lug 33 which engages the front of the end sill and is adapted to receive bolts for securing the casing to the end sill. The fastening lug 33 also performs the function of a stop to properly position the casing and align the shaft 14 with the brake shaft 9.

The operation of the invention is as follows:

When the brake shoes are new there should be from five to six inches of slack in the brake chain to permit the brake shoes to swing away from the car wheels and thereby avoid dragging on the wheels. This slack increases as the shoes and brake connections wear and to accommodate this, the Westinghouse air brake system provides a maximum travel of 12'' for the cylinder piston. My invention is designed for use in connection with this standard air brake system and I contemplate providing for a greater take up than 12'' so that effective braking force may be applied after the air brake piston has reached the limit of its travel. It will be understood, however, that the hand brakes are principally used in switching but there are emergencies when the air brakes fail to work properly and the brakes must be operated manually. In my invention the chain is wound first upon the larger part of the drum and finally upon the smaller part which merges into the shaft 21. By increasing the diameter or the length of the larger part of the drum I can increase the total take up and at the same time take up the slack more speedily; and by lengthening the reduced portion of the drum or that portion of the shaft 21 into which the drum merges I provide more space for the chain and by reducing the diameter thereof I can get more power. This variation in take up and power may also be effected by varying the sizes of the gears in a manner which should be clearly understood by those skilled in the mechanic art.

In the operation of a hand brake it is highly important that the slack in the chain should be taken up quickly so that the power may be applied to the brake shoes with little loss of time. It is important not only that the power be applied quickly but that the full force be applied quickly. In other words the object is to apply the brake by hand as nearly as possible as it is applied by the air brake system and not to any greater extent. When the hand wheel 10 is turned to the right to rotate the brake shaft and the shaft 14 to the right as indicated by the arrow in Fig. 2, the segment gear 17 revolves with the brake shaft slowly and by engagement with the pinion 23 rotates the shaft 21 and revolves the conic chain drum 26 at a comparatively high rate of speed to take up the slack in the brake chain. During this operation the pinion 28 is revolved slowly by meshing engagement with the gear 29, and rotates freely on the part 21' of the shaft 21, and the ratchet element 30 rides over the teeth of the ratchet element 31 on pinion 28 and slides upward on the squared portion 21'' of the shafts 21, because the shaft and the ratchet wheel are then traveling faster than the pinion 28. The segment gear 17 passes out of meshing engagement with the pinion 23 at or about the time the slack of the brake chain has been taken up in the operation just described and then the drum must be revolved at a comparatively slow rate of speed in applying the power to the brake shoes. This operation automatically and immediately follows the slack taking up operation just described and the parts operate in the following manner. During the taking up operation the drum is revolved through the segment 17 and pinion 23; during the power applying operation the drum is revolved through the gear 29 and the pinion 28. After the segment gear 17 has passed out of meshing engagement with the pinion 23 the ratchet element 30 is engaged by the teeth 28' of ratchet element 31 and the brake drum is rotated by pinion 28, gear 29 and the hand wheel shaft 9. The diameter of the gear 29 is small compared with the diameter of the pinion 28 and this increases the power applied from the brake shaft to the drum. During the operation of applying the power to the brake shoes after they have been brought into contact with the car wheels the chain is winding on the lower portion of the drum which is of small diameter thereby further increasing the power. As the shaft is rotated the brakeman pushes the dog 12 into constant contact with the ratchet 11 which locks the brake in adjusted position.

When the locking pawl 12 is disengaged from the ratchet wheel 11 the brake shoes swing back away from the car wheel and the brake chain pulls on the drum and causes the working parts of my invention to operate in a direction reverse to that hereinbefore described without locking. As the drum revolves in reverse direction the ratchet element 30 remains in operative engagement with the ratchet element 31 and the pinion 28 operates in meshing engagement with the gear 29. During the initial reverse movement of the drum the segment 17 is out of meshing engagement with the pinion 23 and the ratchet wheel 20 revolves freely with the segment gear. When the segment gear comes into meshing engagement with the pinion 23 the ratchet element 30 remains in operative engagement with the pinion 28 and the ratchet element 20' moves freely under the ratchet element 20 and in so doing pushes it up on the shaft 14'. In this way the parts resume their initial position while the brake shoes are returning to their normal position and without locking the gears.

I claim:

1. In a car brake, a power shaft, a brake chain drum, a driving gear fixedly mounted on said power shaft, a driven gear rotatively mounted on said drum and meshed with said driving gear, a driving segment gear rotatively mounted on said shaft, a gear fixedly mounted on said drum and meshed with said segment gear, one gear ratio being greater than the other, and individual overrunning ratchet elements mounted respectively on said shaft and said drum to rotate therewith, and ratchet elements on said rotatively mounted gears operatively engaging said first named ratchet elements respectively.

2. In a car brake, a power shaft, a brake chain drum, a segmental gear rotatively mounted on said shaft, a ratchet non-rotatively mounted on said shaft and adapted to engage said gear when said shaft is rotated to set the brake, a relatively small pinion non-rotatively mounted on said drum and meshing with said gear, a gear non-rotatively mounted on said shaft, a relatively large pinion rotatively mounted on said drum, and a ratchet non-rotatively mounted on said drum and adapted to be engaged by said rotatively mounted pinion when the latter is rotated to set the brake.

3. In a brake device, a casing, a brake drum rotatively mounted therein and provided with a relatively fixed pinion and with a relatively rotating pinion of different diameter, a power shaft rotatively mounted in said casing and provided with a relatively fixed gear meshed with said rotating pinion on said drum and with a relatively rotating segmental gear meshed with said fixed pinion on said drum, means on said shaft for positively engaging said segmental gear only when said shaft is rotated in a predetermined direction, and means on said drum by which said drum is positively engaged by said rotating pinion when the latter is driven by the rotation of said fixed gear in said predetermined direction.

4. In a car brake, a power shaft, a conical brake chain drum, means for rotating said drum by said power shaft at different speed ratios during the setting of the brake, said means being synchronized with the winding of the brake chain on said conical drum so that the greatest speed ratio between said shaft and said drum is simultaneous with the winding of the brake chain on the larger portion of said drum.

5. In a brake gear, a driving shaft, a driven shaft, a gear drive from said driving shaft to said driven shaft, a second gear drive at a different ratio from said driving shaft to said driven shaft, the gears of the second gear drive being permanently in mesh, means for automatically rendering said second gear drive inoperative when said first gear drive is operated, said first gear drive automatically discontinuing after predetermined angular displacement of the driven shaft and said second gear drive becoming operative upon the discontinuance of said first gear drive.

6. In a brake gear, a power shaft, a jack shaft, brake applying means connected with said jack shaft, a high ratio train of gearing between said shafts becoming inoperative after predetermined angular displacement of the jack shaft, a low ratio train of gearing between the shafts including a gear rotatably mounted on the jack shaft, the gears of the low ratio train of gearing remaining permanently in mesh, and means for automatically rendering the low ratio train of gearing operative when the high ratio train of gearing becomes inoperative.

7. In a brake device, a frame adapted to be attached to a car, driving and driven shafts journaled in said frame, high ratio and low ratio gearing between said shafts, ratchet devices mounted on each of said shafts for rotation therewith but capable of movement longitudinally thereof.

In testimony whereof I have hereunto subscribed my name this 7th day of January, 1921.

GEORGE A. WOODMAN.